United States Patent Office 2,734,616
Patented Feb. 14, 1956

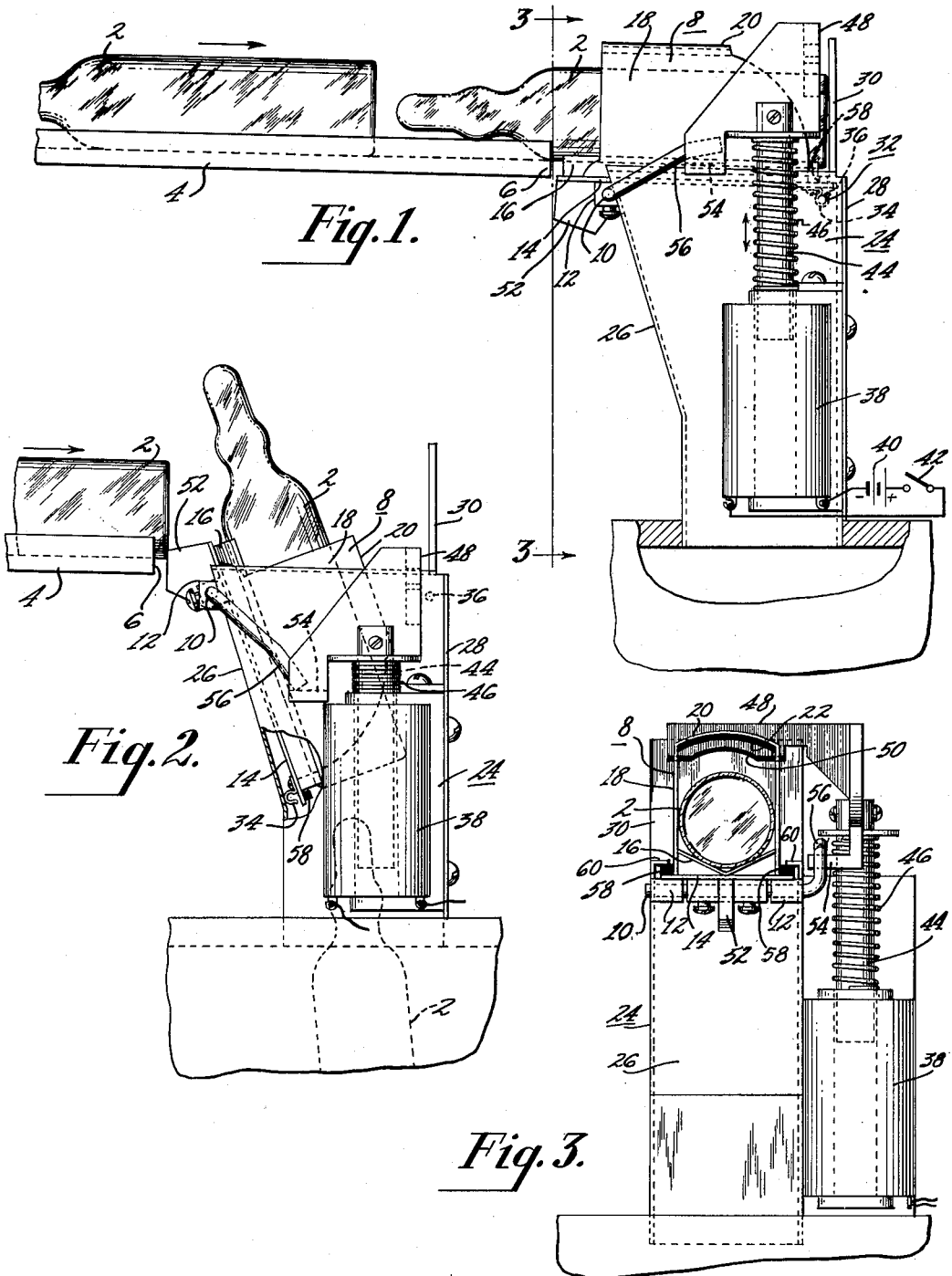

2,734,616

ARTICLE TRANSFER DEVICE

Roger E. Schell, Woodbury, and Lester R. Moskowitz, Belmar, N. J., assignors to Radio Corporation of America, a corporation of Delaware Application January 31, 1952, Serial No. 269,308

8 Claims. (Cl. 198—27)

This invention relates to a device for transferring articles and, more particularly, to a device for taking elongated articles received from a magazine in a horizontal position and orienting them to a vertical position one at a time and in response to some signal of external origin.

Although the device of the present invention is by no means limited to the handling of articles of any one type or for any one particular purpose, it may be used in connection with a device for automatically inspecting small transparent containers filled with liquid. An inspection device of the type referred to is described in U. S. Patent 2,531,529 issued November 28, 1950, to J. F. Price. In the device described in the patent, small transparent containers are placed by hand, one at a time, against a pair of spaced apart rubber surfaced rollers. A beam of light is passed through the space between the rollers and focussed on the contents of the container while the container is spun rapidly by rotating the rollers. A stream of air drawn rapidly back through the space between the rollers creates a suction which is sufficient to hold the container against the rollers without any further support. The rotating contents of the container are inspected photoelectrically after rotation of the container has been abruptly halted.

In apparatus designed for mass inspection of containers, such as ampules containing medicinals, it is desirable to have mechanical means for presenting each container automatically to the inspection device. It is also desirable to have the automatic feed device operate without permitting more than a minimum volume of dustladen air to be drawn into contact with the various optical elements of the inspection system since accumulation of dust thereon reduces operational efficiency.

Another problem in devising a suitable automatic infeed device of the type required for the inspection device referred to is that of taking successive ones of a large number of elongated, filled containers lying in a substantially horizontal position and feeding them one at a time in a vertically oriented position to the inspection device.

The improved device of the present invention is one comprising a pivotally mounted article support member, means normally exerting a biasing force for biasing this member in a substantially horizontal rest position, means responsive to a source of external energy for exerting sufficient downward force on an article supported on the support member to overcome the biasing force of the biasing means and cause downward pivotal movement of the support member, whereby said member assumes an inclined position. When the support member assumes the inclined position the article supported thereon slides downward and may be oriented in a substantially vertical position. Means may also be included for returning the support member automatically to its horizontal rest position.

One object of the present invention is to provide an improved transfer device for orienting articles in a desired manner.

Another object of the invention is to provide an improved device for orienting elongated articles received in a substantially horizontal position to a substantially vertical position.

Another object of the invention is to provide an improved means operative in response to a source of external energy for taking successive ones of elongated articles received from a magazine in a substantially horizontal position and discharging them one by one oriented in a vertical position.

Another object of the invention is to provide improved means for automatically feeding successive ones of an article to be inspected, to an inspection chamber, said articles being oriented in a desired position and introduced to said chamber with a minimum amount of air.

Still another object of the invention is to provide improved means for individually feeding a succession of articles to an apparatus with the articles oriented in a desired manner and with the feeding apparatus adapted to function only when an article is in proper position to be handled.

These and other objects will be more apparent and the invention will be more readily understood from the following detail description and the accompanying drawing of which, Figure 1 is a side elevational view of a preferred embodiment of a device constructed in accordance with the principles of the present invention, the device being in normal horizontal rest, or receiving, position, Figure 2 is a view similar to that of Figure 1 with the apparatus in the act of transferring an article, that is, in discharging position, and Figure 3 is an end view, partly in section, taken along the line 3—3 of Figure 1.

Referring now to the drawing, in which like parts in different figures are designated by the same numbers, the articles 2, which are to be oriented, are received from a feed device or magazine, which may be a trough 4 inclined downward at a small angle and connected to a vibrator (not shown). This device, which is conventional, causes the articles to move slowly forward in the direction of the arrow. If the articles are of the type having portions of different diameters such as the medicinal ampules shown in the drawings, they must first all be oriented in the same direction, preferably with their large diameter body portions forward. This may be done mechanically by conventional means as the articles are advanced along the conveyor which feeds the articles to the vibratable trough 4.

The transfer device of the present invention is disposed at the output end 6 of the trough 4. The device comprises an article support member 8, mounted adjacent its inlet end on an axle 10 which is, in turn, pivotally mounted in bearings 12. The support member includes a base plate 14 carrying a trough-like floor 16, side walls 18, and a partial roof 20 lined with a shock absorbing layer of material 22 which may be felt or rubber.

The article support member is mounted over a generally vertical chute 24 having the upper portion 26 of one of its walls inclined away from the vertical for a reason that will be explained later. Another wall 28 of the chute has a vertical extension 30 spaced a short distance from the end of the article support member 8 opposite the pivoted end. This extension serves as a stop to aid in properly positioning each article as it is received on the support member.

The article support member is provided with a friction latch 32 normally biasing the support member in a substantially horizontal position. The latch may comprise a curved leaf spring portion 34 mounted on the underside of the base plate 14 of the support member and a stud 36 on a wall of the chute 24, adapted to be engaged by the spring. Other suitable forms of biasing means may be used such as counterbalancing weights or combinations of counterweights and friction latches.

Means is also provided to cause the support member to pivot downward in response to a source of external energy. This means comprises a solenoid 38 which may be supplied with electrical energy by means of a battery 40 through a circuit manually closed with a key 42. Instead of manual operation, completely automatic operation may be utilized through automatic closing of the solenoid circuit in response to some form of automatic sensing device or operational sequence circuit.

The solenoid 38 is provided with a vertically mounted plunger 44 normally biased to an extended upper position by a coil spring 46. A horizontally extending arm 48 is connected to the upper end of the plunger. The arm is positioned so that it extends across the support member 8 adjacent but spaced a short distance in front of the extension 30. The underside of the arm is preferably surfaced with a layer 50 of soft material such as felt.

In its upper rest position, the arm 48 is positioned at a sufficient height above the floor 16 of the support member to clear the top of an article reclining on the support. The stroke of the plunger is adjusted so that the maximum downward travel of the arm is a line above the floor of the support member.

The transfer device operates as follows. When an article is properly positioned on the support member (as shown in Figure 1), the solenoid is energized by closing the key 42, pulling down the plunger 44 and the arm 48. The under side of the arm strikes the top of the article and the downward force exerted on the article is transmitted to the support member. The force thus exerted on the support member overcomes the biasing force of the latch and the member pivots downward to rest against the sloping side 26 of the chute 24. The article then slides off (as shown in Figure 2) and continues on down the chute.

While the support member is in its downward position the next article in line on the trough 4 is prevented from moving forward too far by a stop 52, mounted below the base plate 14 of the support member at the leading edge, which swings up to block the normal path of travel of the articles at the entrance to the support member.

When the article has slid downward off the support member, the solenoid is de-energized by releasing the key 42. The coil spring 46 then pushes the plunger 44 upward. Connected near the top of the plunger is a tripping lever 54 which extends horizontally outward so that it will engage the end of an extended portion 56 of the axle 10 when the plunger moves upward. When the tripping lever engages the axle portion 56 during the upward stroke of the plunger, the axle is rotated and the support member is raised back to its normal horizontal rest position where it is held by the friction latch.

In order to prevent the entrance of more than a minimum volume of ordinary, dust-laden air into the chute 24, the horizontal cross section of the top of the chute is dimensioned so that it makes a fairly tight fit with the edges of the base plate 14. The lateral edges of the base plate as well as the ends are also provided with rubber sealing strips 58. These strips press against the underside of the horizontal portions of L-shaped members 60 fixed to the side walls of the chute 24.

It will be observed that means has been provided for preventing downward pivotal movement of the support member except when an article is properly positioned thereon. Unless such means is provided, an article which is positioned such that its base is only partially seated on the floor 16 of the support member may be catapulted upward with force sufficient to break it, when the support member swings downward.

The protective means comprises the mounting of the force-exerting arm 48 very close to the stop 30 and adjusting the stroke of the plunger 44 so that, if no article is in place on the support member, the arm will not travel far enough to strike the floor of the support member. Thus, if no article is ready for transfer or, if the article is not seated entirely on the support member when the solenoid is actuated, the arm 48 will move downward but the support member will remain in its horizontal rest position.

What is claimed is:

1. A transfer device comprising a pivotally mounted article support member, friction latch means normally holding said member in substantially horizontal position, means responsive to a source of external energy and positioned for exerting sufficient downward force on an article supported on said member to open said latch means and cause downward pivotal movement of said member whereby said member assumes an inclined position.

2. A transfer device comprising a pivotally mounted article support member, friction latch means normally holding said member in substantially horizontal position, a solenoid including a plunger, means connected to said plunger and positioned to exert a downward force on an article positioned on said member in response to energization of said solenoid and consequent movement of said plunger, whereby said latch is opened and said member assumes an inclined position.

3. A transfer device comprising a pivotally mounted article support member, means normally holding said member in substantially horizontal position, a solenoid including a plunger, means biasing said plunger to a normal rest position when said solenoid is de-energized, means connected to said plunger and positioned to exert downward force on an article positioned on said member in response to energization of said solenoid and movement of said plunger against the force exerted by said biasing means whereby said member is caused to assume an inclined position, and means responsive to movement of said plunger by force exerted by said biasing means when said solenoid is de-energized for returning said member to its horizontal position.

4. A transfer device comprising a pivotally mounted article support member, means normally holding said member in substantially horizontal position, a solenoid including a plunger, a spring biasing said plunger to a normal rest position when said solenoid is de-energized, means connected to said plunger positioned so as to exert a downward force on an article positioned on said member when said plunger is retracted by energization of said solenoid whereby said member is caused to assume an inclined position, means connected to said plunger and engageable with means connected to said member when said plunger is moved by said spring to its normal rest position for moving said member to its horizontal position.

5. A transfer device comprising a pivotally mounted article support member, article stop means positioned at one end of said member, means normally biasing said member in substantially horizontal position, means responsive to a source of external energy and disposed above said member adjacent said stop means for exerting sufficient downward force on an article supported on said member to overcome the biasing force of said biasing means and cause downward pivotal movement of said member, whereby said member assumes an inclined position.

6. A transfer device comprising a pivotally mounted article support member, article stop means positioned at one end of said member, friction latch means normally holding said member in substantially horizontal position, an arm disposed above said member adjacent said stop means, operating means for causing said arm to move downward so as to exert a force on an article properly positioned on said member sufficient to open said latch and cause downward pivotal movement of said member, whereby said member assumes an inclined position.

7. The combination with a device for conveying a linear succession of articles in a substantially horizontal direction, said articles being in a reclining position, of apparatus for transferring successive articles therefrom and depositing said articles one after another in an upright position, said apparatus comprising an article support member to receive one of said articles at a time from said device, a pivotal mount for said member, means normally biasing said member in a substantially horizontal position, and means responsive to a source of external energy and positioned for exerting sufficient downward force on an article positioned on said member to overcome the biasing force of said biasing means and to cause downward pivotal movement of said member, whereby said member assumes an inclined position and said article slides off in a substantially vertically oriented position.

8. The combination according to claim 7 including means preventing the next article in line from passing from said device to said member while said member is in said inclined position.

References Cited in the file of this patent

UNITED STATES PATENTS

| | | |
|---|---|---|
| 1,083,494 | Johnson | Jan. 6, 1914 |
| 1,435,263 | Soubier | Nov. 14, 1922 |
| 1,602,719 | Straight | Oct. 12, 1926 |
| 1,729,635 | Steensburg | Oct. 1, 1929 |
| 2,411,821 | Choat | Nov. 26, 1946 |
| 2,430,605 | Francona | Nov. 11, 1947 |
| 2,520,253 | Norris | Aug. 29, 1950 |